Jan. 5, 1943.  L. B. EHRLICH  2,307,204
ELECTRIC WINDSHIELD WIPER
Filed Sept. 21, 1938   2 Sheets-Sheet 1

INVENTOR
LOUIS B. EHRLICH
BY Falvey & Stoltenberg
ATTORNEY

INVENTOR
LOUIS B. EHRLICH
BY
ATTORNEY

Patented Jan. 5, 1943

2,307,204

UNITED STATES PATENT OFFICE 2,307,204

ELECTRIC WINDSHIELD WIPER

Louis B. Ehrlich, Toledo, Ohio

Application September 21, 1938, Serial No. 231,022

7 Claims. (Cl. 172—239)

This invention relates to electric windshield wipers, more particularly to the method of "parking" the wiper blade in a predetermined position on the windshield by dynamically braking the electric driving motor.

In the prior art, electric motors have been utilized to drive windshield wipers but the systems proposed have been unsatisfactory in that after cessation of the wiping operation, difficulty was experienced in parking the wiper blade along an edge of the windshield where it did not obstruct the vision of a driver. Heretofore mechanisms for parking the wiper blade along the lower edge or other predetermined positions have depended upon an "inching process" which consisted of manual manipulation of the control switch to close the electrical circuit through the driving motor until the wiper had moved to the predetermined position. This method of parking was obviously unsatisfactory.

The same result has been sought by the use of complicated mechanisms which were designed to open the power circuit through the motor at a predetermined time, after which the motor would "coast" to a standstill to determine the final parked position of the wiper blade. This method was also unsatisfactory, in that the conditions under which the wiper blade was operating were not the same in all cases, so that its resistance to overcome the rotational inertia of the armature during the "coasting" period varied, and resulted in inconsistent parking positions for the wiper blade. For example, if snow hampered the movement of the wiper blade during the "coasting" period, the motor rotational inertia would be restrained to a degree which would stop the armature very quickly and the wiper would not attain the most desirable parked position but would stop before it was attained. On the other hand, if the resistance was relatively light, such as was obtained when the wiper blade operated upon a clean windshield, the rotational inertia of the motor would be restrained with a smaller resistance, so that the motor would rotate too freely and "over coast," so that the wiper blade moved past the parked position and back into the operating plane of the windshield.

The present invention contemplates the provision of an electric windshield wiper which has a parking device utilizing the dynamic-braking principle for stopping the electric driving motor at a predetermined position, at which the wiper blade on the windshield is in a predetermined parked position.

The problem of applying the dynamic-braking principle to this parking situation involves the provision of a mechanism to short-circuit the armature while it is moving in a magnetic field produced by energized field coils. Without energisation of the field coils, the dynamic braking effect will be inoperative and the problem of using this principle successfully in a windshield wiper has revolved around the difficulty of opening the field circuit after the armature has ceased to rotate.

In solving this problem, the present invention contemplates the use of an electric relay which is responsive to conditions in the armature circuit, the relay being preferably of a type that is sluggish in response to changed conditions during the opening phase of the operation cycle, so that a very small current is required to hold the armature in actuated or closed position. This sluggish action of the relay prevents slight variations of conditions in the armature circuit such as small changes in current value flowing in the armature or even a reversal of current flow in the armature from affecting the relay and allow the field circuit to open and thereby destroy the magnetic field which is necessary for the successful operation of the dynamic-braking principle.

The present invention contemplates the provision of a relay to control the field circuit of a shunt windshield wiper motor which is responsive to conditions in the armature circuit of the motor so as to open the field circuit after short circuit current has ceased to flow in the armature when the motor is dynamically braked. For this purpose, various types of magnetic actuating coils for the relay have been utilized, being connected in several different relations with respect to the armature circuit of the motor. In one instance, the actuating coil of the relay is placed in parallel with the short-circuiting connections of the armature so as to obtain a by-pass current to hold the relay in actuated position. In a modification of the invention, the relay coil has been positioned in the armature circuit to carry the full armature short-circuit current. In another modification, the relay is provided with a pair of actuating coils, one of which is utilized to carry the normal armature current, while the second coil is utilized to carry the armature short circuit current, both coils acting at selected times, and magnetically in the same direction so as to maintain the relay in actuated position.

The problem of opening the armature circuit and short-circuiting the armature upon itself in a predetermined angular position at selected times is solved by the use of a cam in connection with the shaft of the armature, the cam having a very sharp hump so as to move a switching element at selected times to open the armature power circuit and substantially simultaneously to close a circuit which short-circuits the armature upon itself to obtain the dynamic braking effect of the armature in the magnetic field created by the field coil.

During the normal operation of the wiper, the switching device, actuated by the cam, is over-controlled by a manually controlled switching device which determines the times under the volition of an operator at which the cam-actuated switching means shall be active in the armature circuit. In this manner, an operator can control the operating conditions of the windshield wiper and by the use of the manually-controlled switching device he can determine the times at which the cam-actuated switching device shall open the armature circuit and sequentially short-circuit the armature upon itself, which, in turn, automatically determines the conditions under which the relay controlling the field circuit shall operate to open and close the field circuit.

It is, therefore, an object of this invention to provide an electric windshield wiper motor which will automatically park the blade at a predetermined position upon the windshield after the actuation of a manual switching device by a single manual movement by the operator.

It is a further object of this invention to provide an electric windshield wiper motor using the dynamic-braking principle for parking the blade in which the field circuit of the motor is opened by a relay which is responsive to conditions in the motor armature during the short-circuiting period.

It is a further object of this invention to provide an electric motor suitable for use with a windshield wiper such as used on automobiles in which the dynamic-braking principle is used, the short circuit condition being consummated when the armature of the motor is in a predetermined angular position and the field circuit of the motor is automatically opened after cessation of the short-circuiting current in the armature It is a further object of this invention to provide an electric motor adapted to operate a windshield wiper through the medium of a speed reducing gear, in which a cam-operated switch is provided to open the armature power circuit and to short-circuit the armature upon itself, an electric relay being provided responsive to conditions in the armature circuit to control the field circuit, and a manual switching means being provided to over-control the cam-operated switch.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 3:
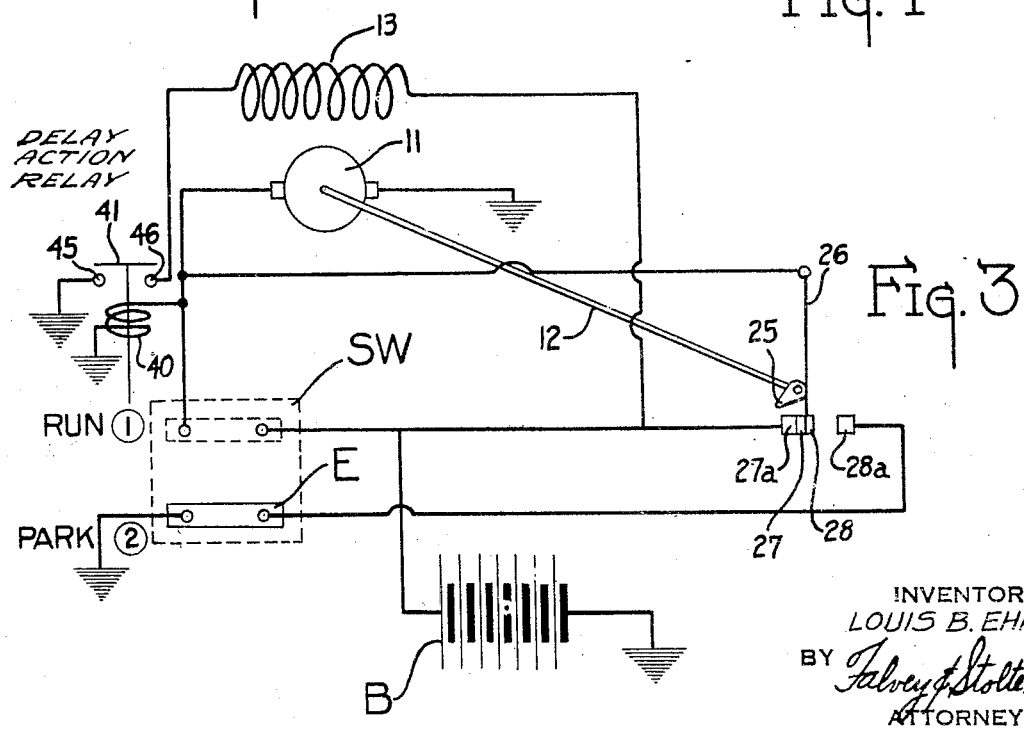
Figure 4:
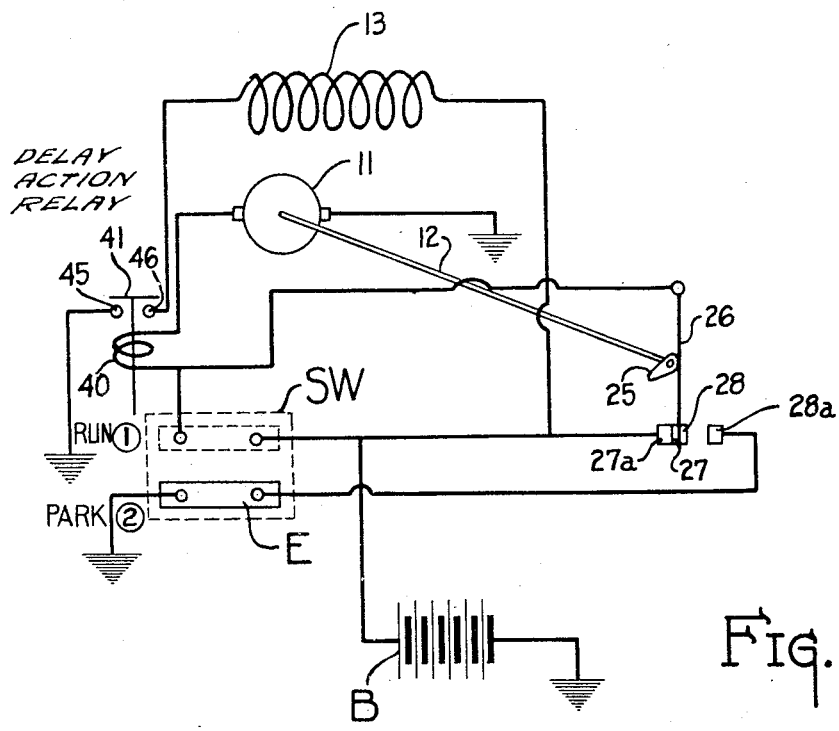
Figure 5:
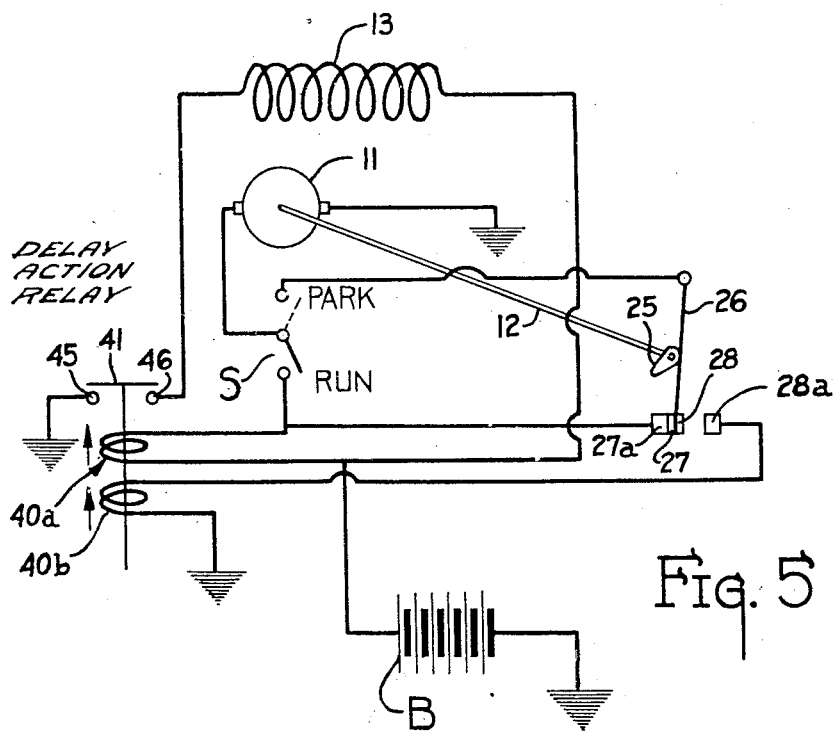

Figures 3, 4, and 5 are schematic diagrams of connections showing different modifications of the invention.

Figures 1, 2:
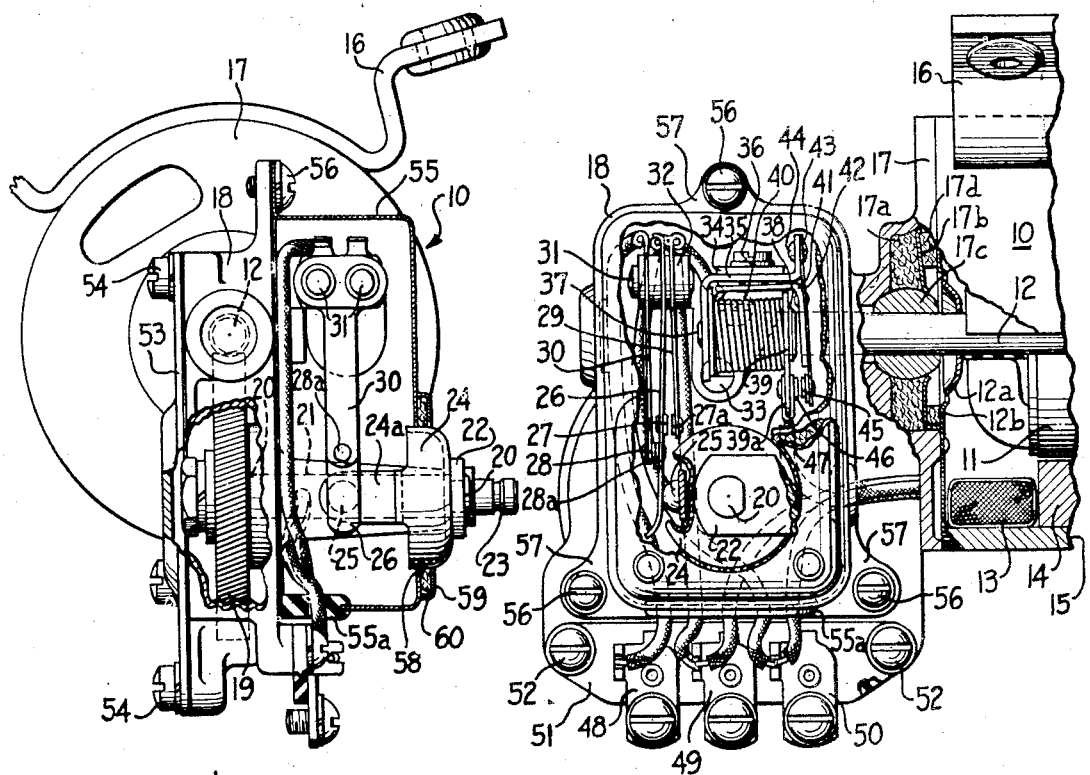
Figure 1 is a plan view, partly in section, of the switching mechanisms and driving motor of the invention.
Figure 2 is an elevational view, partly in section, of the mechanism shown in Figure 1.

Referring to the drawings, particularly to Figure 1, an electric motor 10 is provided, preferably of the shunt field type, having its rotatable armature 11 mounted on shaft 12 and having a field coil 13 mounted on field poles 14 which are positioned in a well known manner in a shell 15. The shell is preferably provided with mounting brackets 16 at convenient locations on its exterior surface to adapt the motor for mounting upon any suitable structure to support it in working relation to devices which it is to drive. The shell 15 is provided at its ends with heads 17 which cooperate with the shell 15 in a well known manner. The shaft 12 projects through the forward head 17 into an outwardly extending casing 18 which is adapted to house a reducing gear and also switching devices to be described hereinafter. In the head 17, a depression 17a is formed into which is fitted an oil saturated felt washer 17b, held in position in the depression to cooperate with a spherical self-aligning bearing 17c which journals the shaft 12 of the armature, both washer and bearing held in position by a spring washer 17d. Adjacent the inner end of the bearing 17c, an oil thrower 12a is provided on the shaft 12 to prevent oil from entering the armature by creepage along the shaft. The oil thrower 12a is adapted to project by centrifugal force all oil into a felt-collecting ring 12d which substantially prevents any oil from entering the electric motor.

The reducing gear is of a worm and gear type, in which the projecting end of the shaft 12 is provided with a worm (not shown) which cooperates with a worm gear 19 mounted on a transverse shaft 20 which is journaled in a bore formed in a boss 21 preferably made integral with the casing 18. The ratio between the worm and the worm gear may be any suitable proportion, depending upon the speed of rotation of the motor and the selected speed of rotation of the transverse shaft 20.

The end of transverse shaft 20, projecting from the boss 21, is provided with a laterally projecting crank arm 22 which is keyed to the shaft to rotate therewith. The crank arm 22 is provided with an eccentric pintle 23 which may be adapted to drive any convenient apparatus, such as, for example, windshield wiper devices for automobiles. The driven devices will not be described in detail, however, the present mechanism may be modified to suit any structures of this type as is well known in the art.

A depending skirt 24 concentric with the shaft 12 is provided to rotate with the arm 22 and is provided with a depending projection 24a which may be integral with the skirt or attached thereto in any convenient manner. The lower end of the depending projection 24a is provided with an insulated knob 25 which acts in the nature of a cam to rotate concentrically with the transverse shaft 20 and describing a path about the boss 21. A spring switch arm 26 is provided to project into the path of the rotating knob 25 so as to be displaced to different positions to actuate pairs of contact points 27, 27a, and 28, 28a, of which 27 and 28 are mounted upon the switch arm 26 and 27a and 28a upon cooperating switch arms 29 and 30. The switch arms 26, 29 and 30 may be conveniently mounted by rivets 31 in insulated relation upon a bracket 32 attached to the casing 18 in any convenient manner as by screw 33. As the depending projection 24a is rotated through the medium of the transverse shaft 20, the knob 25 will at selected times come into contact with the switch arm 26 to bring into contactual relation the contact points 28 and 28a to complete selected electrical circuits. As the knob 25 is further rotated, the resiliency of the arm 26 will move the arm to the right (Figure 1) so as to open the contactual relation between the pair of contacts 28 and 28a and will make a contactual relation between pairs of contacts 27 and 27a to close other electrical circuits.

From this structure, it is clear that as the transverse shaft 20 is rotated by the worm gear 19, under the influence of the armature shaft 12, the knob 25 will act in the nature of a cam to displace resilient spring 26 to make and break the circuits formed by the pairs of contacts 27, 27a and 28, 28a in a sequential relation which will be utilized in a structure to be described hereinafter.

On a lateral edge of the bracket 32, an upstanding lug 34 is provided which is preferably in a transverse plane to the contact arms 26, 29, and 30, to support an electromagnetic switching device or relay which comprises in part of a Z-shaped bracket 35 of magnetic material, the central portion of which is attached to the lug 34 by means of screw 36 in threaded relation with an aperture in the bracket 35. The two branches of the bracket 35 which are preferably in parallel relation with each other are provided with apertures, one of which is provided with a stud 37 of magnetic material provided with a flat head 38 and an insulated retaining head 39 which is utilized to hold a coil 40 in position about the stud 37. The head 38 of the stud terminates adjacent the plane of the other branch of the Z-bracket 35 so as to enable an armature 41 comprising an L-shaped strip of magnetic material to be suspended on the branch to cooperate with the head. One leg of the armature is adapted to cooperate with the flat head 38 of the magnetic stud 37 and the other leg, to reduce magnetic reluctance of the device, is adapted to cooperate with the central portion of the Z-bracket 35. The armature 41 is suspended in cooperative relation with the stud 37 by means of a flexible spring 42 which is riveted to the armature adjacent the bend between its two legs and is provided with an extending portion 43 which is attached to the adjacent arm of the Z-bracket 35 by rivet 44.

Inasmuch as the spring strip 42 is relatively flexible, the armature 41 is capable of considerable displacement which allows the armature to come into close magnetic cooperation with the flat head 38 of the magnetic stud 37. This close cooperation allows the armature to remain in contactual relation with the flat head 38 even when the magnetic flux flowing through the magnetic circuit formed by the stud 37, the Z-bracket 35, and the armature 41 is at a relatively low value. The magnetic air gap between the parts is reduced to a minimum which increases the effectiveness of the flux flowing through the parts and allows the armature to remain in actuating position with a lower current value flowing in the electromagnet. Sluggish action of the relay is desirable.

The spring strip 42 extends beyond the armature 41 and is provided with a contact point 45 adjacent its end to cooperate with a second contact point 46 positioned in insulated relation on the lateral extension 39a of the retaining head 39 of the magnetic stud. The contact point 46 is provided with a metallic lug 47 which is adapted to provide a convenient means whereby electrical connections may be made therewith.

Adjacent the lower end of the casing 18, binding posts 48, 49 and 50 are provided which are held in fixed relation on an insulating strip 51 which is fastened to the casing 18 by means of screws 52. The binding posts 48, 49, and 50 which are provided with upstanding projections for convenient means to solder internal leads from the active electrical parts of the device, allow ready connection of the device to external circuits as indicated schematically in Figs. 3, 4, and 5.

To protect the worm and worm gear in the casing 18, a plate 53 is provided to cover the depression in which they are fitted; the plate is conveniently attached to the casing 18 by means of screws 54. On the other side of the casing 18, a dust-proof cover 55 is provided which is fastened to the casing 18 by means of screws 56 which cooperate with lugs 57 formed on the cover 55 as is clearly shown in Figure 1. Adjacent the lower part of the casing, contiguous to the binding posts 48, 49, and 50, apertures are provided in the case 55 to allow leads to cooperate with the binding posts. Rubber grommets 55a are provided to enclose the leads to form a weather-proof joint and to insulate the leads from the casing 55. Adjacent the forward side of the casing 55 an aperture 58 is provided through which extends the transverse shaft 20 with its cooperating depending skirt 24. A weather-proof joint is formed at this point by providing a metallic container 59 housing an oiled felt strip 60 contacting the outer surface of the skirt 24, which rotates in contact with the felt.

Referring to Figure 3 of the drawings, a schematic diagram of connections is shown which illustrates one method of connecting the active electrical parts of the structure in circuit to attain the results desired. In this figure, the armature 11 drives the cam 25 through the medium of shaft 12 so as to drive the spring member 26 to place the contact pairs 27, 27a and 28, 28a in contactual relation at selected times to complete cooperating circuits. A manual switch SW is provided and connected in circuit so as to "over control" the effect of the contact pairs 27, 27a and 28, 28a in their circuit relations. A battery B is provided to supply electrical energy for the activation of the various circuits illustrated, in which the circuits through the armature 11 are primarily controlled by the manual switch SW and secondarily by the contact pairs 27, 27a and 28, 28a under the control of the switch arm 26 as actuated by the cam 25. The circuit through the field coil 13 is controlled by the contacts 45 and 46 which are actuated by the armature 41 and coil 40 of the relay.

A manual switch SW is provided which is capable of having its movable element E shifted to two positions, the first as shown in phantom in Figure 3 is the "running" position, while the second position shown in solid line is the "parking" position. These positions are selectively obtainable by successive manual manipulation of the switch. The details of this manual switch may vary widely and inasmuch as many standard types of switches well known in the art will fulfill the requirements of the present circuits, no specific switch will be described.

The second position of the switch at which the motor is "parked" as shown in Figure 3, having reference to the use of the motor for driving a windshield wiper, gives a combination of circuits for the motor in which the motor armature circuit is under the control of contact pairs 27, 27a and 28, 28a, and the field circuit through the field coil 13 is secondarily under the control of these contacts. Upon actuation of the switch SW to the first position, as shown in phantom in Figure 3, the battery B is placed in circuit with the armature 11 and the coil 40 of the relay. Under these circumstances, upon closure of the switch there will be a comparatively heavy momentary rush of current through the armature of the motor but inasmuch as the armature 41 of the relay cooperating with the coil 40 will be actuated substantially simultaneously to close the contact points 45 and 46 to complete the field circuit, a field magnetism will begin to build up which will tend to curtail the current flowing in the armature of the motor. When the magnetic field is established, a motor action begins and the armature will accelerate until it rotates at normal speed which will continue as long as the switch element E is in the first position.

With the rotation of the armature, the position of the cam 25 will be changed and moved into contact with the switch element 26 so as to successively create a contactual relation between the pairs of contact points 27, 27a and 28 and 28a. The contactual relation between these pairs of contact points will, however, be ineffectual with the manual switch element E in the first position because these parts are electrically "dead."

To stop the rotation of the armature of the motor at a predetermined point, or to park the wiper which it is operating in a predetermined position, the element E of the manual switch SW is thrown to its second position as shown by the solid lines in Figure 3. This will open one branch of a pair of paths for the armature current as established by the first position of the element E, one branch of which establishes a current flow through the manual switch SW with the element E in the first position, the other branch establishes a current flow through the contacts 27 and 27a under control of the cam 25. In the same manner, one branch of a pair of paths energizing the coil 40 of the relay which controls the field circuit will be opened so as to place the energy received by the coil 40 from the battery B under the control of the cam 25 through the medium of the contact points 27 and 27a, as has already been described with reference to the armature current. After actuation of the manual switch SW to place the element E in its second position, the motor will continue to rotate until "parking" position is reached, energized by the current from the battery B in the normal manner, and the coil 40 will also continue to be energized to hold the contact points 45 and 46 in contactual relation to keep the field circuit of the motor closed.

With the motor running under these circumstances, the cam will continue to change its position under the influence of the motor until the hump of the cam is advanced to a position where it cooperates with the arm 26, so that the contactual relation between contact points 27 and 27a will be broken and contactual relation will be made between contact points 28 and 28a. With the separation of the contact points 27 and 27a, the battery B will no longer energize the armature 11 nor the coil 40 but will continue to supply energy to the field 13 as long as the contact points 45 and 46 remain in contactual relation. Due to the sluggish action of the relay, the field circuit will remain closed for a short period of time after the contact points 27 and 27a are separated and will, therefore, maintain the field circuit of the motor closed during the interval between the opening of contact points 27, 27a and the closing of contact points 28, 28a.

Substantially simultaneously with the opening of the contact points 27, 27a, the contact points 28, 28a will be closed which will short-circuit the armature upon itself and allow a dynamic or regenerative braking effect to arise and absorb the rotative inertia of the armature. The principle of the dynamic brake is well known in the art and will not be described in detail. The short-circuiting current generated by the armature is of a sufficient potential to cause a very small current to flow through the coil 40 which will maintain the contact points 45 and 46 closed during the duration of this potential. Upon cessation of rotation of the armature under the influence of the dynamic-braking effect, this potential will cease and the relay will open to break the contactual relation between the contact points 45 and 46 to open the field circuit of the motor.

In this manner, the armature of the motor may be stopped within a narrow margin of angular movement of the pintle 23 of the arm 22 which is utilized to drive the windshield wiper or other selected mechanisms. Due to the relatively high reduction ratio of the gear and worm, the motor braking effect will control with very narrow limits of variation the movement of the arm 22. When the mechanism is in "parked" condition, it is ready for a new cycle of operation.

In Figure 4, a similar arrangement is shown to that illustrated in Figure 3, differing, however, in the method of energizing the coil 40 of the relay. After the manual switch element E in this modification has been moved to the second position, and the contact points 27, 27a have been opened by the action of the cam 25, coil 40 carries the full short-circuit current of the armature after the contact points 28, 28a have been closed. During the running condition, the coil 40 also carries the full armature current as drawn from the battery B. In other respects, this modification is substantially similar to that already described.

In Figure 5, a diagrammatic sketch of connections is illustrated in which the coil of the relay is divided into two portions, 40a and 40b, of which one is used only during the running phase of the motor, while the other is used only during the dynamic-braking phase, their circuit relations being controlled by the pairs of contact points 27, 27a and 28, 28a. Both coils act magnetically in the same direction and are preferably sluggish in action as described above with reference to the magnetic structure of the relay. This arrangement assures certainty of action on the part of the relay. The manual switch S illustrates another form of switching means that may be utilized in this and the other modifications of the invention. In this figure, the manual switch is in the nature of a single pole double throw switch.

What is claimed:

1. In a device of the class described, an electric motor having an armature circuit and a shunt field circuit, energized from a source of electrical energy, a normally open electromagnetically controlled switch to open and close the shunt field circuit, an electromagnet for the switch in circuit with the armature circuit and responsive at all times to current flowing therein, a control switch for the armature circuit, means cooperating with the armature to actuate the control switch in timed relation with the rotation of the armature to open the armature power circuit and to short-circuit the armature substantially simultaneously whereby the armature is stopped at a predetermined position by dynamic braking, and a two-position manual switch to control the action of the control switch for the armature adapted in one position to short-circuit the control switch in the armature circuit to allow continuous operation of the motor, and in the second position to effectuate the control switch to dynamically brake the motor at the predetermined position.

2. In a dynamically-braked electric motor energized from a source of electrical energy with an armature circuit and a shunt field circuit, manually controlled means for closing the armature circuit with the source of electric power for continuous operation of the motor, electromagnetic means including a normally open circuit-closing means responsive to current flowing in the armature circuit to close the shunt field circuit with the source of electric power, an armature circuit control means over-controlled by the manually controlled means and cooperating with the armature to open the armature circuit at selected times and also in timed relation with the rotation of the armature and to substantially simultaneously short-circuit the armature to stop the armature at a predetermined position by dynamic braking, and a second manually controlled means cooperating with the first manually controlled means and the armature circuit control means to initiate the operational sequence of the armature circuit control means at the selected times to stop the motor, whereby the electromagnetic means will open the shunt field circuit upon substantial termination of current flow in the armature.

3. In a device of the class described, an electric motor having an armature circuit and a shunt field circuit both cooperating with a source of electrical energy to energize the armature and the field to allow the armature to operate a device to be stopped at a predetermined angular position, control means to open the armature circuit at the predetermined angular position of the operated device, means to short-circuit the armature after the armature circuit has been opened to stop the device by dynamic braking, manual means to over-control the control means including a two-position switch, adapted in one position to short-circuit the control means for continuous operation of the motor, and in the second position to initiate the operation of the control means and the means to short-circuit the armature to stop the motor, and normally open switch means actuated by the current in the armature circuit to open the field circuit upon substantial cessation of rotation of the armature.

4. In a device of the class described, a dynamically-braked electric motor having a shunt field, a source of energy for the motor, an electromagnetic relay to control the flow of current from the source of power to the shunt field, an electromagnetic coil for the relay in series circuit with the armature of the motor when the armature is in circuit with the source of power, a second electromagnetic coil for the relay adapted to respond to the current of the armature during the dynamic-braking period, means to sequentially open the power circuit to the armature and to connect the armature across the second electromagnetic coil to initiate a dynamic-braking action to stop the armature at a predetermined point, and manual means to control the initiation of the braking period.

5. The combination with an electric motor having an armature winding and a shunt field winding deriving energy from a source of power, of control means to sequentially stop the flow of energy from the source of power to the armature and thereafter to short-circuit the armature, and electromagnetic means adapted to control the flow of energy from the source of power to the field winding, said electromagnetic means being adapted to be responsive to energy conditions in the armature circuit by having a pair of coils under control of the control means, where one coil is in series with the armature winding only when the armature winding is in circuit with the source of power, and the second coil is in series with the armature winding only during the short-circuiting thereof.

6. In a device of the class described, a dynamically-braked electric motor having a shunt field, a source of power for the motor, a normally-open circuit-closing means in the shunt field circuit, electromagnetic means to control the circuit-closing means responsive to current flowing in the armature circuit of the motor to close the shunt field circuit, a manually-controlled two-position switch adapted in one position to close the armature circuit with the source of power to cause the motor to operate continuously, motor-operated control means to open the armature circuit at a predetermined relative position of the armature when enabled by the actuation of the manually controlled switch and to substantially simultaneously close a short circuit for the armature circuit, said short circuit for the armature circuit being closed alternatively by the manually-controlled two-position switch on its second position whereby said motor, by the short circuit of the armature, is dynamically-braked to a predetermined relative position.

7. In a dynamically-braked electric motor with an armature circuit and a shunt field circuit connected with a source of power, a normally-open electromagnetic means to control the field circuit and to open the field circuit when the current flowing in the armature circuit is substantially zero for a substantial period of time, a manually operable switch adapted to control the circuit through the armature for connection alternately with the source of power for continuous operation of the motor and for short circuiting the armature to dynamically-brake the armature, a motor-controlled switching means responsive to a predetermined position of the armature to maintain the armature circuit connected to the source of power when enabled by the manually-operable switch until the predetermined position of the armature is attained, at which time the armature circuit is opened by the motor-controlled switching means and substantially simultaneously the armature circuit is short-circuited by the motor-controlled switching means through the manually operable switch.

LOUIS B. EHRLICH.